United States Patent [19]

Wulf et al.

[11] Patent Number: 4,755,098
[45] Date of Patent: Jul. 5, 1988

[54] EQUIPMENT FOR LOADING A CARGO SPACE ONTO A VEHICLE AND FOR REMOVING THE CARGO SPACE OFF THE VEHICLE

[75] Inventors: Per Wulf, Ulricehamn; Jan Peterson, Blidsberg, both of Sweden

[73] Assignee: Oy Partek Ab, Raisio, Finland

[21] Appl. No.: 860,349

[22] PCT Filed: Aug. 21, 1985

[86] PCT No.: PCT/FI85/00070

§ 371 Date: Apr. 23, 1986

§ 102(e) Date: Apr. 23, 1986

[87] PCT Pub. No.: WO86/01469

PCT Pub. Date: Mar. 13, 1986

[30] Foreign Application Priority Data

Aug. 23, 1984 [FI] Finland .................. 843327

[51] Int. Cl.⁴ .................................. B60P 1/64
[52] U.S. Cl. .......................... 414/546; 414/498; 414/491; 414/555
[58] Field of Search ............... 414/421, 498, 546, 420, 414/555, 556, 491, 352, 541

[56] References Cited

U.S. PATENT DOCUMENTS

| | | | |
|---|---|---|---|
| 3,239,080 | 3/1966 | Corompt | 414/541 |
| 3,984,013 | 10/1976 | Wirz | 414/352 |
| 4,053,074 | 11/1977 | Lamaire | 414/491 |
| 4,175,904 | 11/1979 | Airaksinen | 414/421 |
| 4,204,793 | 5/1980 | Lemaire | 414/421 |
| 4,290,726 | 9/1981 | Sutela et al. | 414/421 |
| 4,341,500 | 7/1982 | Laitinen | 414/498 |
| 4,344,731 | 8/1982 | Visa et al. | 414/491 |
| 4,350,469 | 9/1982 | Corompt | 414/491 |
| 4,453,878 | 6/1984 | Paukku | 414/491 |

FOREIGN PATENT DOCUMENTS

| | | |
|---|---|---|
| 12145 | 6/1980 | European Pat. Off. . |
| 107892 | 5/1984 | European Pat. Off. . |
| 2651258 | 5/1976 | Fed. Rep. of Germany . |
| 2628060 | 6/1976 | Fed. Rep. of Germany . |
| 2522896 | 12/1976 | Fed. Rep. of Germany . |
| 50081 | 9/1975 | Finland . |
| 2407156 | 5/1979 | France . |
| 2460802 | 1/1981 | France . |
| 39212 | 9/1975 | Japan . |
| 72429 | 5/1980 | Japan . |
| 327169 | 8/1970 | Switzerland . |
| 1540611 | 2/1979 | United Kingdom . |
| 2018716 | 10/1979 | United Kingdom . |
| 2085845 | 5/1982 | United Kingdom . |
| 899394 | 1/1982 | U.S.S.R. . |

Primary Examiner—Robert R. Song
Attorney, Agent, or Firm—Burns, Doane, Swecker & Mathis

[57] ABSTRACT

Equipment for loading a cargo space (2), such as an interchangeable platform or container, onto a vehicle and for its removal from same and/or for dumping the cargo space. The equipment includes a horizontal frame (4) pivotable around a transverse horizontal shaft (7) placed at its rear part, a folding frame (5), whose rear end (9) is attached to the front end of the horizontal frame (4), being pivotable around a transverse horizontal shaft (8), and a hook part (10) being pivotably attached about a transverse horizontal axis to the front end of the folding frame, the upper end of the hook part being provided with a grasping member (11) for engaging the cargo space (2). An arm (22) is attached by means of articulated joints between the hook part (10) and the horizontal frame (4) so that the articulation point (23) between the arm and the hook part is placed at a lower level than the articulation point (21) between the folding frame and the hook part. The articulation point (24) between the arm (22) and the horizontal frame (4) is placed further forward than the articulation point (8) between the folding frame (5) and the horizontal frame (4).

1 Claim, 7 Drawing Sheets

400;
EQUIPMENT FOR LOADING A CARGO SPACE ONTO A VEHICLE AND FOR REMOVING THE CARGO SPACE OFF THE VEHICLE

FIELD OF THE INVENTION

The present invention is concerned with equipment for loading a cargo space, such as an interchangeable platform or container, onto a vehicle and for its removal from same and/or for dumping the cargo space.

BACKGROUND OF THE INVENTION

In prior art, so-called hook-device type equipments are known for loading a truckbox or a container onto a vehicle. Such equipments are described, e.g., in the Finnish Patent Nos. 63,350 and 53,352.

When a truckbox or a container is being removed off a vehicle, at the initial stage of the movement a substantially horizontal path of movement of the grasping hook and, consequently, also of the truckbox or container rearwards is required before the truckbox or container is tilted. In the solution suggested in the Finnish Patent No. 63,350 this phase of horizontal shifting is produced by initially just pivoting an angle piece around its horizontal shaft. It is only after this that the horizontal middle frame of the loading equipment is pivoted, whereby the truckbox or container is tilted. In this prior-art equipment a distance of horizontal shifting can be accomplished up to about one meter.

OBJECTS AND SUMMARY OF THE DISCLOSURE

It is an object of the present invention to increase the said distance of horizontal shifting. The equipment in accordance with the invention is characterized in that the articulation point between the arm and the horizontal frame is placed further forwards than the articulation point between the folding frame and the horizontal frame. By means of this new mechanism, a horizontal shifting movement of about 2 meters can be achieved while the hook moves along a gentle S-curve. The construction in accordance with the invention improves the usability of the equipment in covered spaces of low height.

BRIEF DESCRIPTION OF THE DRAWING

The invention and its details will be described in further detail in the following with reference to the accompanying drawings, wherein.

DETAILED DESCRIPTION OF A PREFERRED EMBODIMENT

Figure 7:
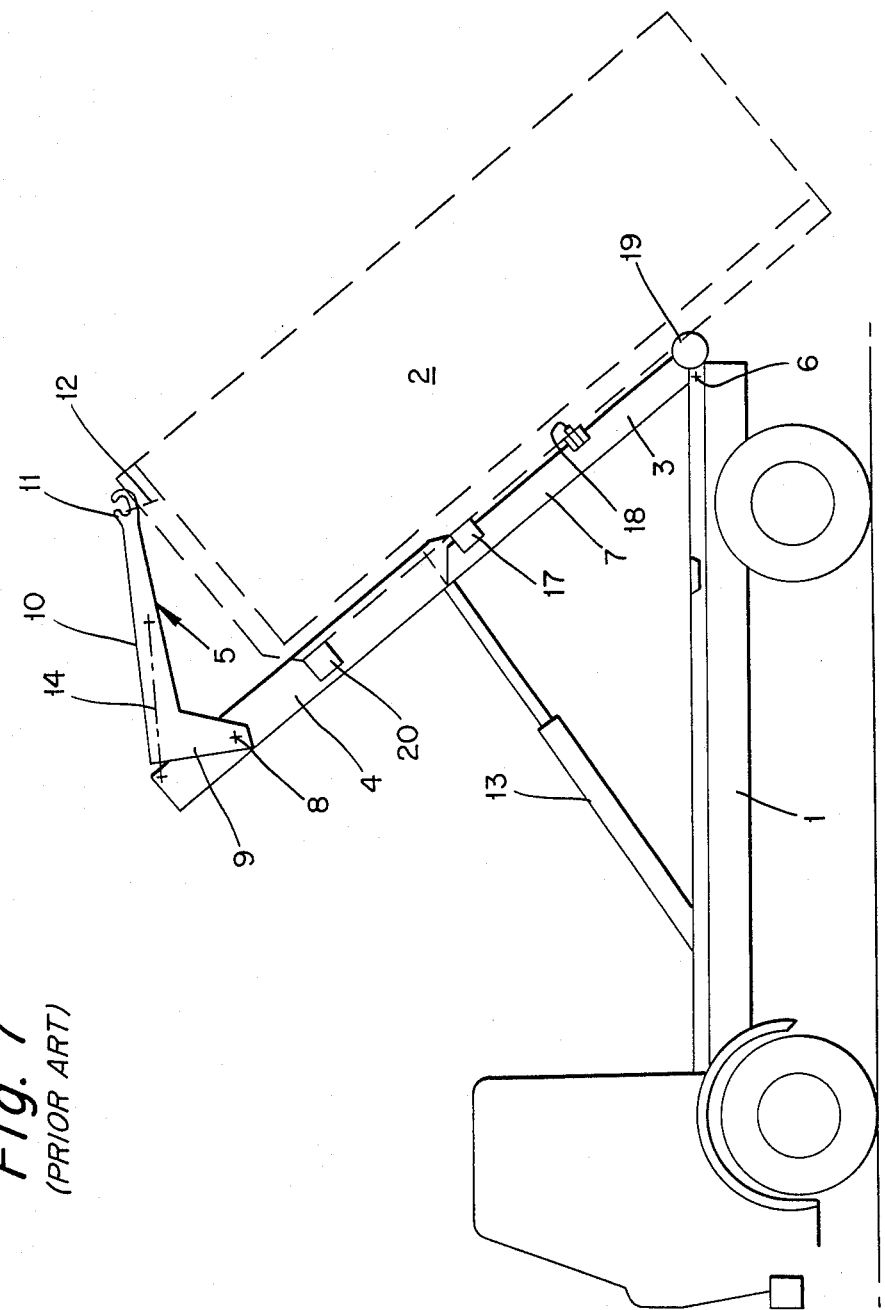
FIGS. 7 and 8 show a truck in two different dumping positions.
Figure 8:
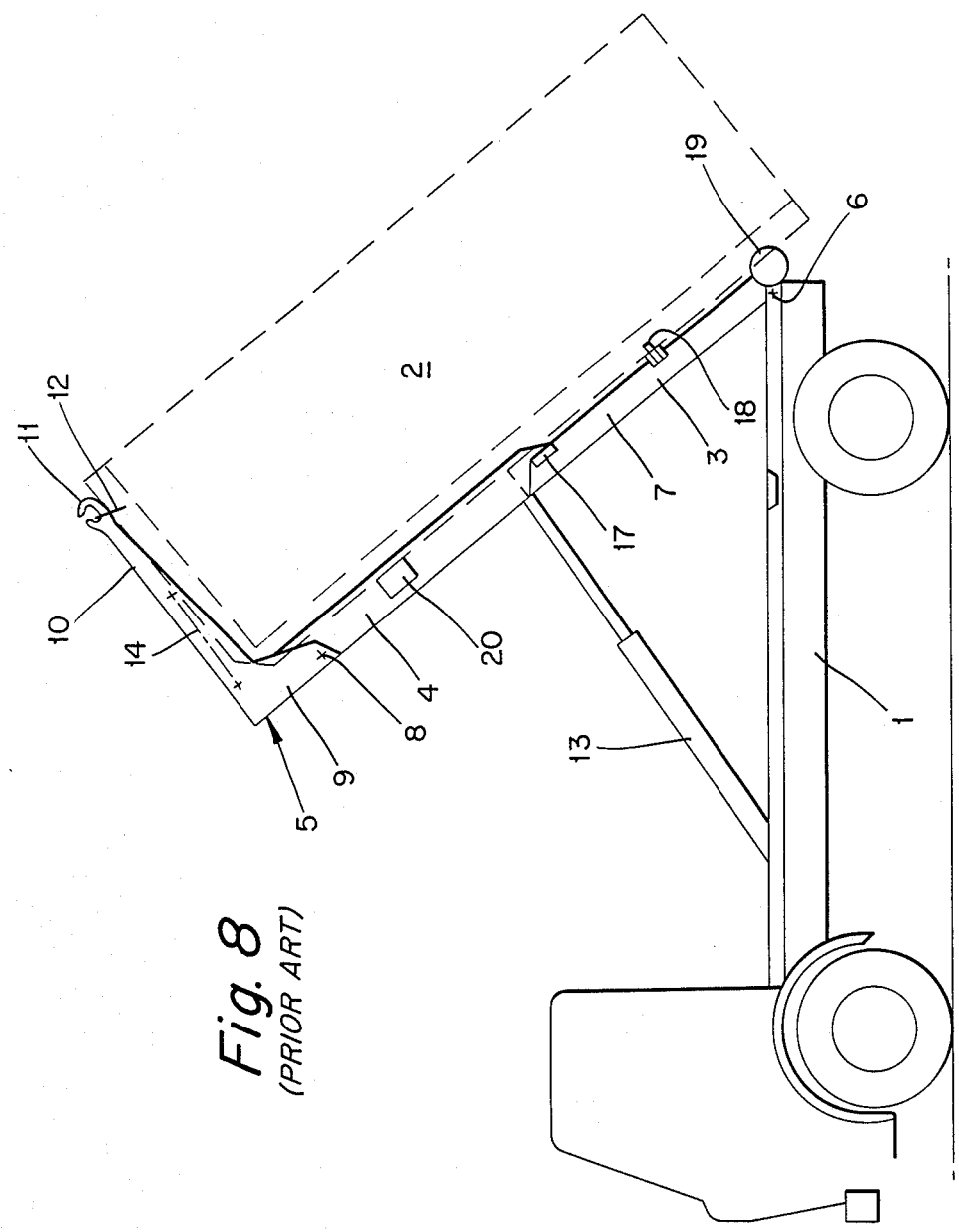

The loading equipment shown in FIGS. 1 to 6 comprises three frame parts: a rear frame, a middle frame 4, and an L-shaped folding frame or hook part 5. As is shown in FIGS. 1 to 4, the rear frame 3 is, at its rear part, attached to the rear end of the chassis beams 1 of the truck through articulation points 6. The rear frame 3 can pivot around the articulation points 6 relative the chassis beams 1, i.e. the rear frame 3 can be pivoted relative the chassis beams 1 to the ordinary dumping position (FIGS. 7 and 8). At the rear end of the rear frame 3, there are support rolls 19 for supporting and guiding the interchangeable platform 2 during loading. The rear frame 3 also includes locking equipment 18 for locking the interchangeable platform onto the loading equipment. To the rear frame 3, a middle frame 4 is attached by one of its ends pivotably by means of a transverse horizontal shaft 7 or by equivalent articulation points. Facing the ends of the rear frame 3, laterally projecting stop pieces 17 are fitted on the middle frame 4, and prevent pivoting of the middle frame 4 to below the rear frame.

Figure 3:
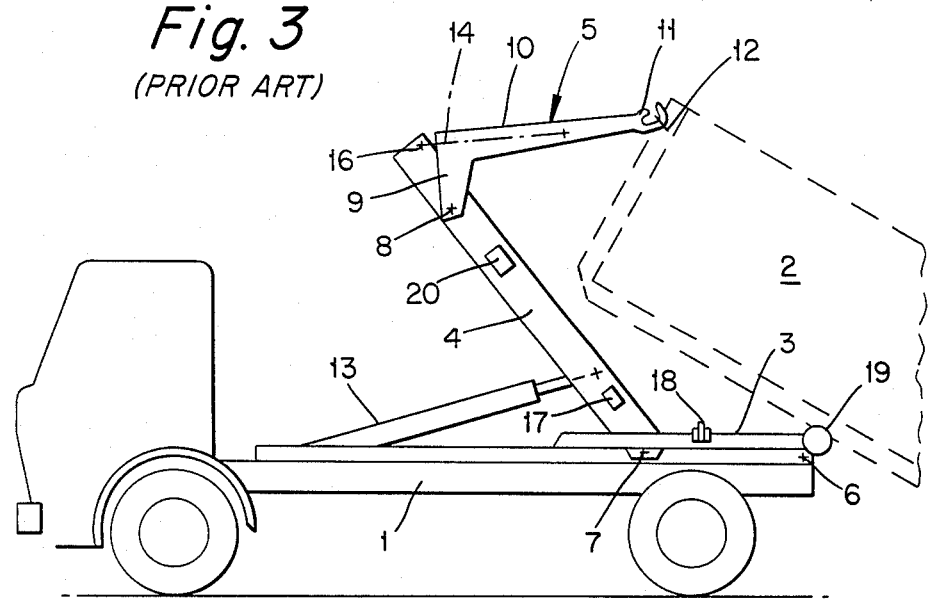
Figure 4:
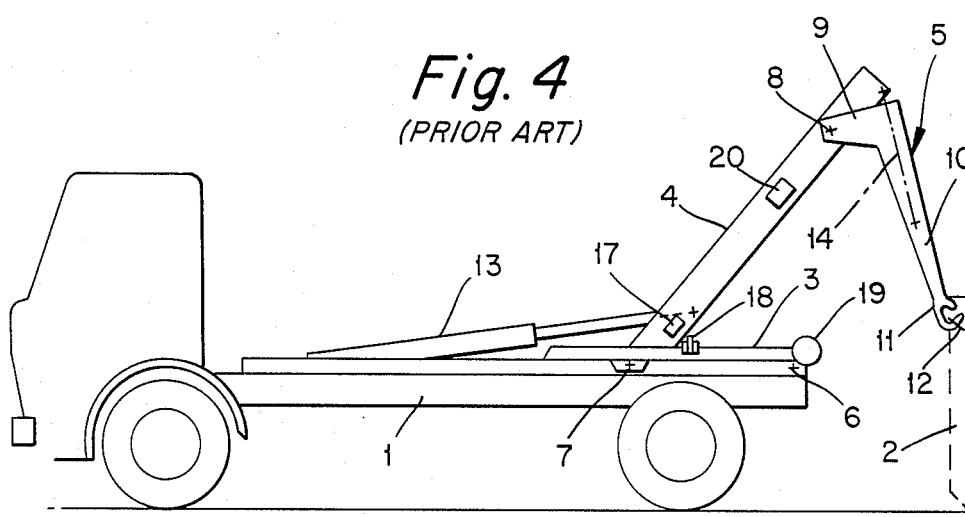
Figure 5:
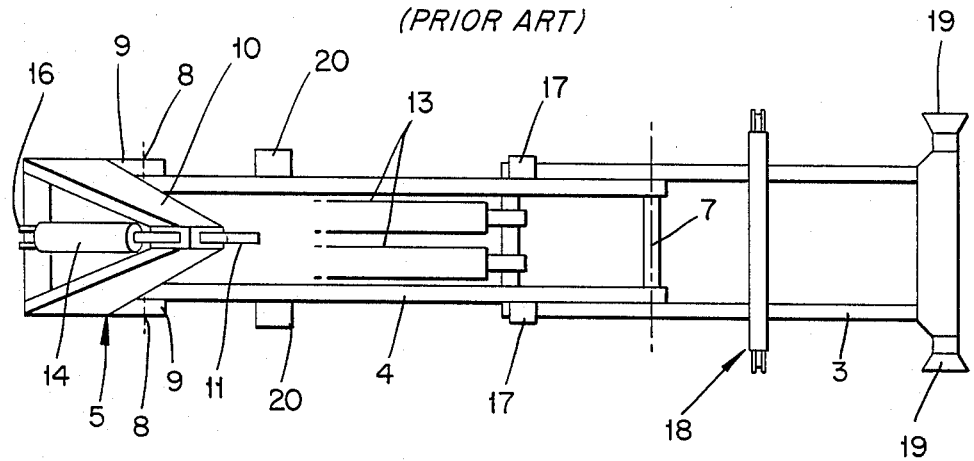
FIG. 5 shows the loading equipment as viewed from above.

In a direction extending outwardly of FIGS. 3 to 5, two parallel main cylinder-piston devices 13 are fitted between the middle frame and the chassis beams 1 of the lorry.

To the front end of the middle frame 4 or in immediate proximity of the front end of the middle frame 4, a hook part 5 is attached by the rear ends of the horizontal portions 9, being pivotable relative a transverse horizontal shaft or articulation points 8.

The upper end of the vertical portion 10 of the hook part 5 is provided with a grasping member, such as a hook 11, for engaging the corresponding grasping part 12 at the front wall of an interchangeable platform 2 or container. For the purpose of pivoting the hook part 5 independently relative the middle frame 4, a cylinder-piston device 14 is fitted between the hook part 5 and the middle frame 4. One end of the cylinder-piston device 14 is attached to the vertical portion 10 of the hook part 5, and the other end to the front end of the middle frame 4, forward of the articulation point 8 between the hook part 5 and the middle frame 4.

Figure 6:
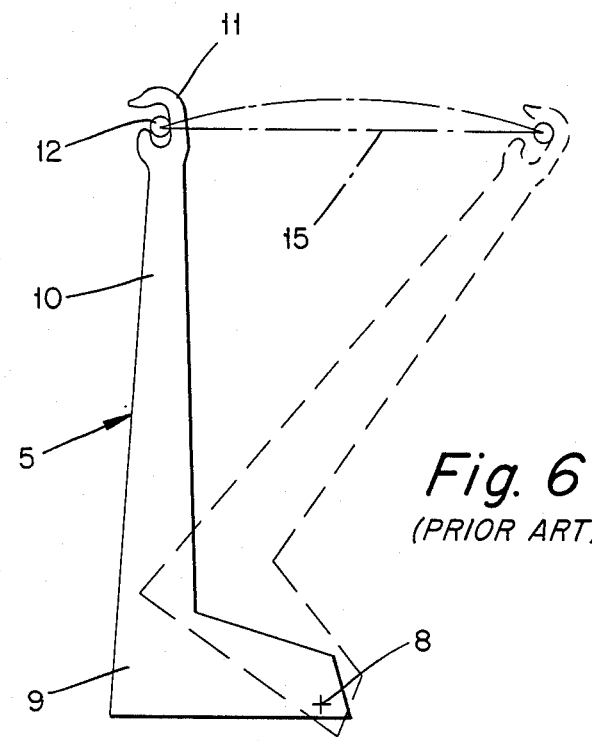
FIG. 6 is a side view of the angle piece of the loading equipment.

According to FIG. 6, the grasping member 11 of the hook part 5 in the loading equipment consists of such a hook in which the play of the gap in the longitudinal direction of the vertical portion 10 of the hook part corresponds to the maximum difference in height on the path of the shape of an arc of a circle formed by the hook relative to the middle frame 4. The arc path is formed when the hook part 5 is pivoted by means of the cylinder-piston device 14 relative to the middle frame 4. The span 15 of the arc of a circle corresponds to the horizontal movement of the interchangeable platform.

Figure 1:
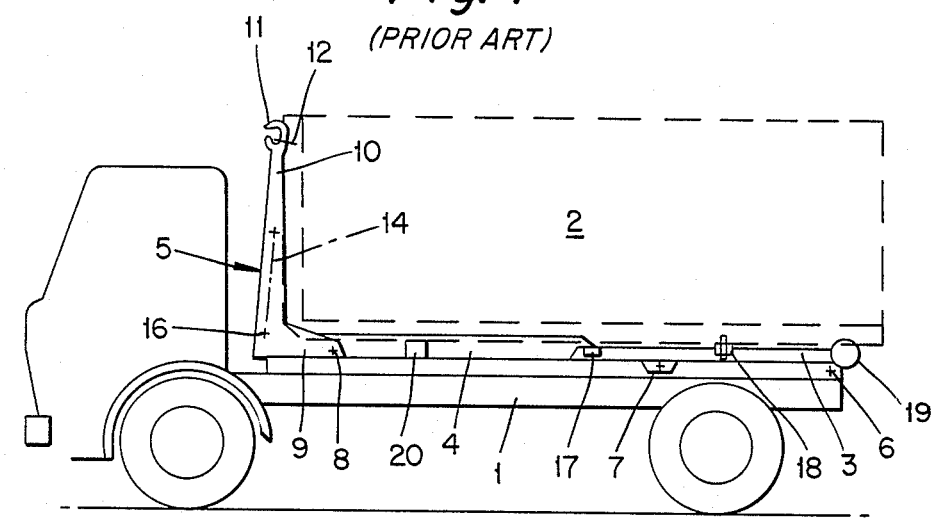
FIGS. 1 to 4 are schematical side views of a lorry provided with a prior-art loading equipment at different stages of loading.

In FIG. 1 the interchangeable platform 2 is placed on the chassis beams 1 of a lorry in the transport position. The hook 11 of the hook part 5 is engaged in the grasping part 12 of the interchangeable platform 2. The interchangeable platform 2 is locked by means of the locking means 18 relative the rear frame 3.

Figure 2:
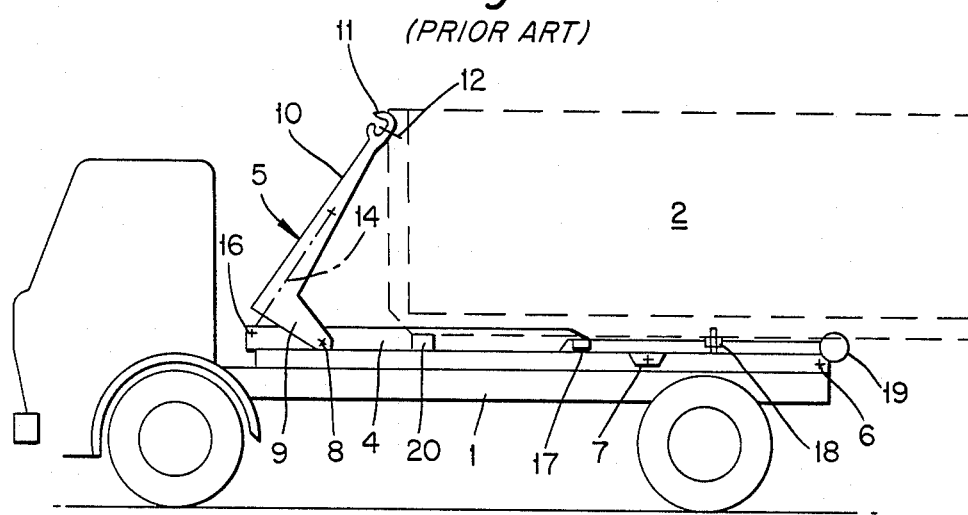

When the locking means 18 are opened in the stage shown in FIG. 1, the interchangeable platform 2 can be shifted rearwards by pivoting the hook part 5 to the position shown in FIG. 2.

From the stage shown in FIG. 2, by means of the main cylinders 13, the middle frame 4 can be pivoted relative the horizontal shaft 7 to the position shown in FIG. 3, and further to the position shown in FIG. 4, in which latter position the interchangeable platform 2 has already been removed from the lorry chassis down onto the ground. When the lorry is driven from the stage (FIG. 4) forwards, the hook 11 of the hook part 5 is detached from the grasping part 12 of the interchangeable platform.

The pulling of the interchangeable platform 2 from the ground onto the lorry chassis takes place in the reversed sequence, as compared with the above.

If the interchangeable platform 2 is supposed to be dumped by means of the loading equipment, at the stage of FIG. 1 or FIG. 2 the locking device 18 is kept locked and the dumping movement is performed by means for the main cylinders 13 in accordance with FIG. 7 or 8. In such a case, the loading equipment remains locked at the rear frame 3 by means of the locking device 18 relative the bottom beams of the interchangeable platform, and all of the three parts of the loading equipment, i.e. the hook part 5, the middle frame 4 and the rear frame 3, supported by the interchangeable platform, pivot relative to the articulation points 6.

Figure 9:
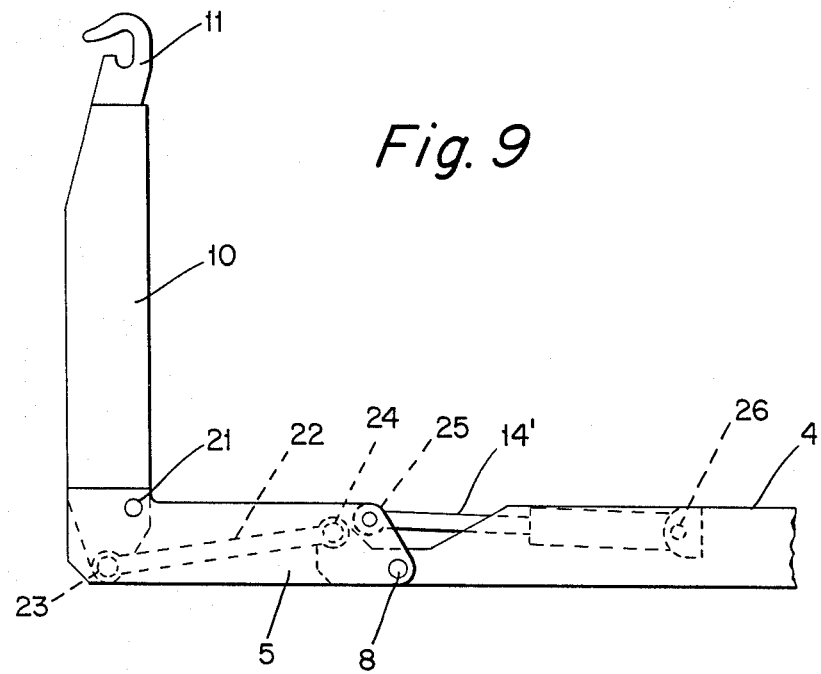
FIG. 9 is a side view of the equipment in accordance with the present invention in its resting position.
Figure 11:
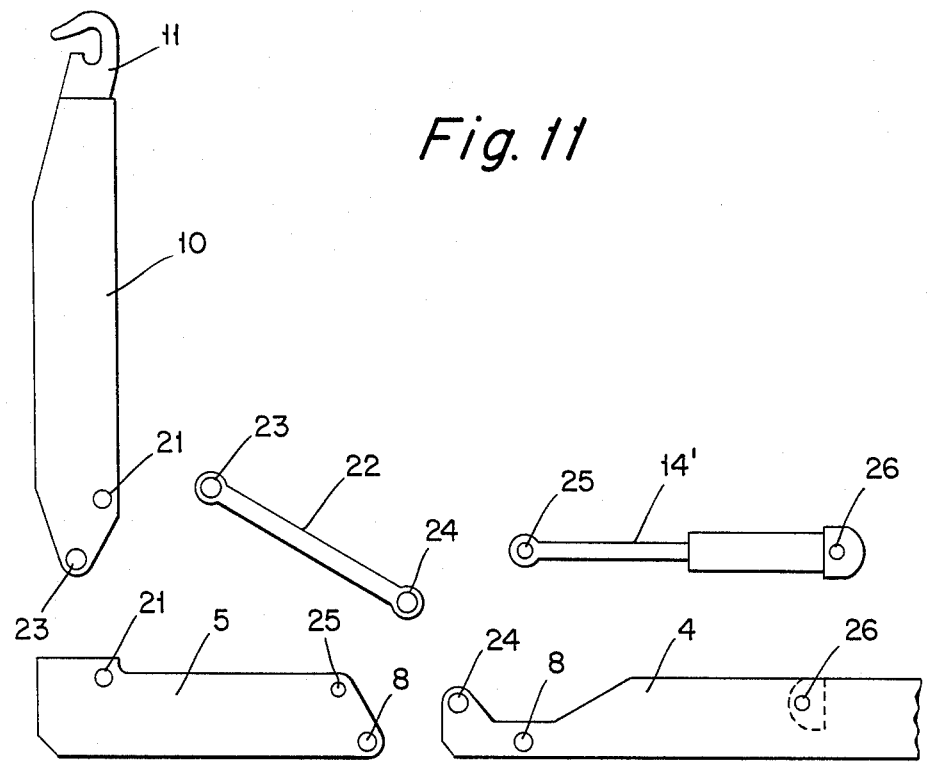
FIG. 11 is an "exploded view" of the components of a part of the equipment shown in FIGS. 9 and 10.
Figure 10:
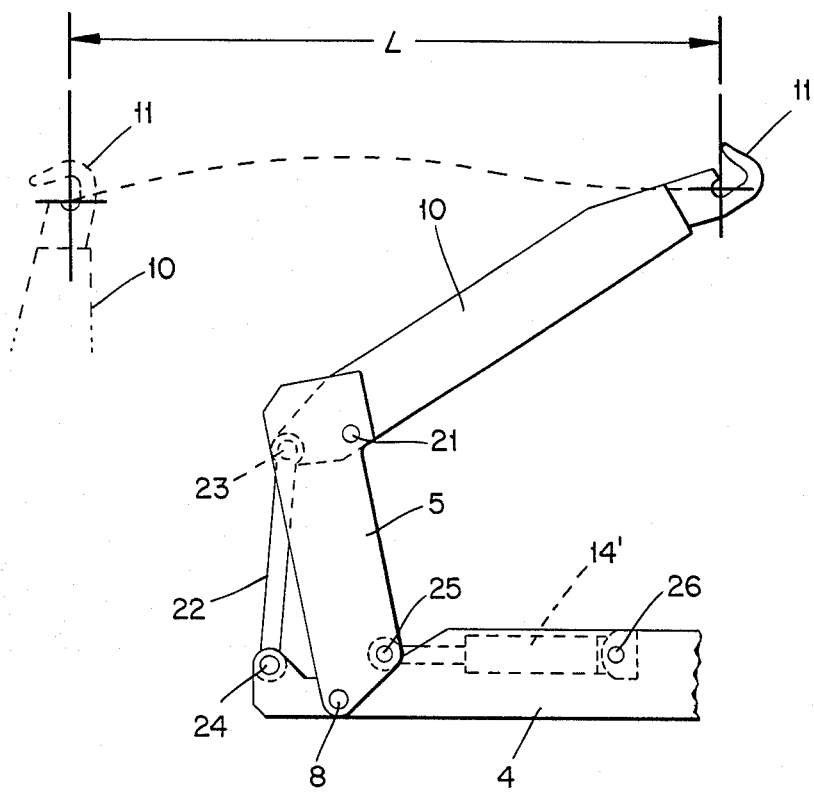
FIG. 10 shows the same at the final stage of the horizontal movement.

The additional improvement in accordance with the invention for the equipment described above is provided by means of the arm construction illustrated in FIGS. 9 to 11. The hook part 10 is attached, by means of an articulated joint 21, to the L-shaped folding frame 5. Between the hook part 10 and the middle frame 4, an arm 22 is attached by means of an articulated joint. The articulated joint 23 between the arm 22 and the hook part 10 is placed below the articulation point 21 between the folding frame 5 and the hook part 10. The articulated joint 24 between the arm 22 and the middle frame 4 is placed further ahead and at a higher level as compared with the articulated joint 8 between the folding frame 5 and the middle frame 4.

In the solution shown in FIGS. 9 to 11, the cylinder-piston device 14 used in the embodiment shown in FIGS. 1 to 8 has been replaced by a horizontal cylinder-piston device 14' attached between the folding frame 5 and the middle frame 4. The articulation point 25 between the cylinder-piston device 14' and the folding frame 5 is placed at a higher level than the articulation point 8 between the middle frame 4 and the folding frame 5. The articulated joint between the cylinder-piston device 14' and the middle frame 4 is denoted with reference numeral 26. When the cylinder-piston device 14' is pulled inwards, the folding frame 5 pivots upwards (FIG. 10).

Between the articulation points 21, 23, 24 and 8, there is an articulated quadrangle consisting of four articulated arms, the quadrangle, on pivoting of the folding frame 5, determining the path of movement of the hook 11 placed at the upper end of the hook part 10. It can be ascertained that, by using such an articulated quadrangle, it is possible to lengthen the substantially horizontal portion of the path of movement so that its length L is about double as compared with the horizontal portion 15 of the path of movement of the prior-art equipment shown in FIG. 6. Instead of an arc of a circle, the shape of the path of movement is now a gentle lying letter S.

The invention is not restricted to the embodiment described above only, but it may show variation in different ways within the scope of the patent claims. The pivoting movement of the folding frame 5 can also be produced by some other means besides by means of the cylinder 14'. The horizontal frame of the loading equipment does not necessarily have to consist of two parts, the rear frame and the middle frame, but it may also be made of one piece.

What is claimed is:

1. Equipment for loading a cargo space, such as an interchangeable platform or container, onto a vehicle and for its removal from same and for dumping the cargo space, whereat the equipment comprises a horizontal frame pivotable around a transverse horizontal shaft placed at its rear part, an actuating device connected to the vehicle chassis for pivoting the horizontal frame, a folding frame whose rear end is attached to the front end of the horizontal frame, being pivotable around a transverse horizontal shaft, and a hook part pivotably attached about a transverse horizontal axis to the front end of the folding frame, the upper end of the hook part being provided with a grasping member for engaging the cargo space, an arm being attached by means of articulated joints between the hook part and the horizontal frame so that the articulation point between the arm and the hook part is placed at a lower level than the articulation point between the folding frame and the hook part, and that the articulation point between the arm and the horizontal frame is placed further forward than the articulation point between the folding frame and the horizontal frame, characterized in that between the folding frame and the horizontal frame, a second actuating device is fitted so as to pivot the folding frame relative the horizontal frame.

* * * * *